United States Patent Office 3,385,526
Patented May 28, 1968

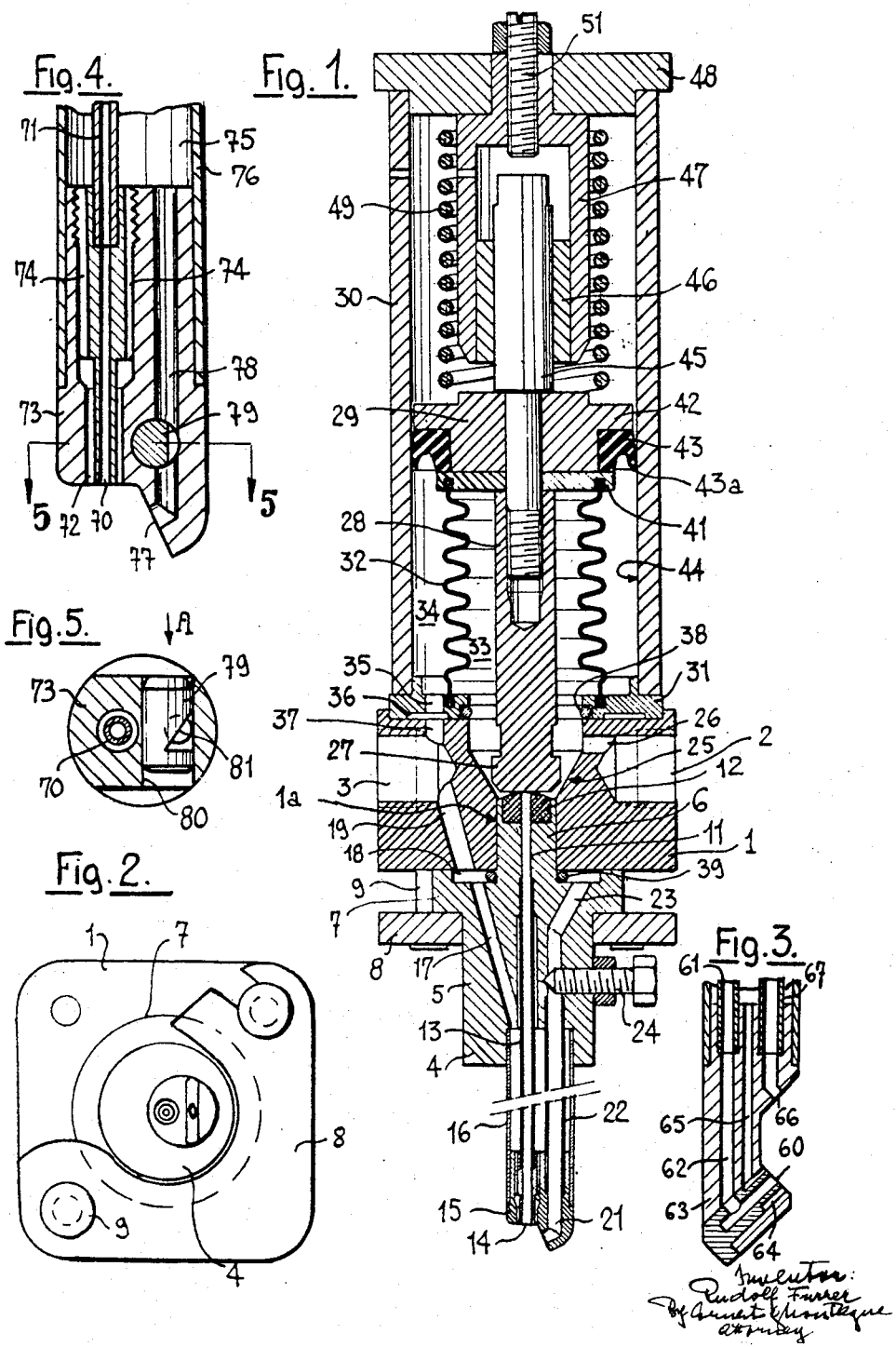

3,385,526
SPRAY GUNS
Rudolf Furrer, Vaud, Switzerland, assignor to Automation Industrielle S.A., Vevey, Switzerland, a corporation
Filed Aug. 31, 1966, Ser. No. 576,262
Claims priority, application Switzerland, Sept. 3, 1965, 12,363/65
5 Claims. (Cl. 239—410)

ABSTRACT OF THE DISCLOSURE

A spray gun which comprises a pneumatically actuated valve for controlling the flow of spray material therethrough. The valve defines a valve chamber forming an interior wall therein. The valve chamber has an outlet surrounded by a valve seat. A valve is movable in the valve chamber between a first position engaging the valve seat and a second position clearing the valve seat. A piston reciprocates in the valve chamber. The piston has opposed first and second sides. The first side carries the valve member. Spring means tend to push the valve member against the valve seat. A deformable tube is disposed coaxial with the valve member and it partitions the valve chamber into inner and outer concentric annular chambers on the first side of the piston. The valve seat is disposed in the inner chamber. A spray material inlet means communicates with the inner chamber and pneumatic pressure inlet means communicates with the outer chamber. A nozzle communicates with the inner and outer chambers.

The present invention relates to a spray gun, more particularly for spraying varnish or paint, wherein the flow of the liquid atomized by a jet of pressurized gas is controlled by a pneumatically actuated valve reacting to the pressure of the gas, generally air.

Guns of this type are known wherein the valve is controlled by a piston or diaphragm through the agency of a rod extending through a gland. The latter has disadvantages, and it has been proposed to overcome these disadvantages by disposing a valve at the end of a Bourdon tube, but the latter is a complicated element which is readily subject to damage and is expensive, and the characteristics of which differ with different supplies.

Also, in known guns employing a Bourdon tube or the like, access to the valve is difficult so that maintenance and cleaning thereof are complicated.

It is one object of the present invention, to provide a valve gun which has no gland whatever and which consists of less expensive elements than Bourdon tubes and has various advantages as will be indicated hereinafter.

It is another object of the present invention, to provide a gun which is characterized in that, the valve is borne by a piston reciprocable in a cylinder and loaded by a counteracting spring tending to push it to a valve seat, the front part of the cylinder being situated between the piston and the seat being divided into two concentric chambers by a deformable tube, the central chamber situated in the deformable tube being connected to a liquid inlet and the outer annular chamber being connected to a gas inlet, the piston co-operating with the cylinder wall solely by means of an annular gasket of deformable material, while axial guidance of the piston is provided independently of the gasket by a rear part of the piston having a smaller diameter than the cylinder and fitted in a guide situated rearwardly of the piston.

With these and other objects in view, which will become apparent in the following detailed description, the present invention will be clearly understood in connection with the accompanying drawings, in which:

FIGURE 1 is an axial section of one embodiment of a gun designed in accordance with the present invention;
FIG. 2 is a bottom plan view of the gun shown in FIG. 1;
FIG. 3 is an axial section of one embodiment of a gun spray head for the gun shown in FIGS. 1 and 2, at an enlarged scale;
FIG. 4 is an axial section of another embodiment of the spray head for the gun shown in FIGS. 1 and 2, at an enlarged scale in axial section; and
FIG. 5 is a section along the lines 5—5 of FIG. 4.

Referring now to the drawing, and in particular to FIGS. 1 and 2, the paint spray gun, as disclosed, comprises a body 1 having an inlet 2 for the paint and an inlet 3 for the air or any other gas under pressure. The spray head 4 is detachably secured to the bottom surface of the body 1.

The spray head 4 comprises a base element 5 having a cylindrical portion 6 fitting in a central aperture 1a of the body 1 and a shoulder 7 engaging beneath a movable retaining flange 8 mounted pivotally on a pivot 9 integral with the body 1 (FIGURE 2). The base element 5 is formed with an axial duct 11, the top end of which leads to the center of an annular valve seat 12 of a relatively hard resilient material. The duct 11, which is intended for the passage of the paint, continues in the form of a tube 13 terminating in a nozzle 14 fitted with clearance in an opening formed in a tip 15.

The tip 15 is mounted on an outer tube 16 borne by the base element 5. The inside of the tube 16 communicates with the air inlet 3 via a duct 17 leading to a circular groove 18 communicating with the inlet via a duct 19.

The air under pressure escapes from the tube 16 through the annular gap between the nozzle 14 and the edge of the opening of the tip 15 and atomizes the paint escaping through the nozzle 14. Lugs disposed at the rear part of the nozzle 14 keep the latter centered in the opening of the tip 15.

The tip 15 has also an auxiliary air nozzle 21 intended to distribute an air jet which laterally deflects the jet of atomized paint. This nozzle 21 is fed by a tube 22 communicating with a duct 23 leading into the groove 18. A pointed screw 24 allows the rate of flow of the auxiliary nozzle 21 to be adjusted.

The central aperture 1a in the body 1 has a flared top part 25 communicating via a duct 26 with the paint inlet 2. A valve 27 co-operating with the valve seat 12 is housed in this flared part 25.

The valve 27 is formed by the bottom end of a central part 28 connected with a piston 29 which is reciprocable in a cylinder 30. The cylinder 30 has a baseplate 31 secured to the body 1 by bolts (not shown). That part of the cylinder 30 which is situated between the piston 29 and the baseplate 31 is divided by a deformable tube 32 into a central chamber 33 for the paint and an outer chamber 34 for the compressed air.

The chamber 33 communicates via a central aperture in the baseplate with the flared part 25 of the duct in the body 1. The chamber 34 communicates with the air inlet 3 via a duct 35, an annular groove 36 and a duct 37.

Annular gaskets 38 and 39 prevent any escape of paint between the baseplate 31 and the body 1 or between the base element 5 of the detachable spray head and the body 1.

The top end of the deformable tube 32 is welded to a plate 41 clamped between the part 28 and a piston head 42 forming an abutment for an annular gasket 43 co-operating with the cylindrical inside 44 of the cylinder 30.

The piston head 42 is of a slightly smaller diameter than the cylinder bore so that there is a small gap between the piston head and the wall of the cylinder 30. The gasket 43, for example of synthetic rubber, has a lip 43a which fits against the wall of the cylinder 30 when pressure is applied to chamber 34. Only this lip 43a bears against the cylinder 30.

A rear rod 45 of the piston 29, of a diameter very much smaller than the piston head 42, is a sliding fit in a guide bush 46 connected with a hollow member 47 borne by an end 48 of the cylinder 30.

A counteracting spring 49 situated between the end 48 and the piston head 42 tends to hold the valve 27 on the seat 12. An axially adjustable stop screw 51 limits the lift of the valve 27.

The spray gun operates as follows: paint from a tank (not shown) enters via inlet 2 and fills the chamber 33, the outlet duct of which is initially closed by the valve 27 resting on the seat 12. When compressed air from a reservoir (not shown) is fed to the inlet 3, some of this air entering groove 18 escapes through the annular opening of the spray nozzle 14 and through the auxiliary nozzle 21. This air enters the outer chamber 34 and also lifts the piston 29 against the action of the spring 49, thus opening the valve 27, which allows the paint to flow to the spray nozzle 14. When the supply of air is interrupted, the valve 27 drops back onto its seat 12 and breaks the flow of paint. The supply of compressed air thus controls the opening or closing of the valve which controls the paint flow.

On removal from the spray pipe, the base element 5 being removed from the body 1, the valve 27 abutting the bottom smaller-diameter part of the flared portion 25 of the bore in the body 1 prevents any escape of paint left in chamber 33, if necessary.

The advantages of the gun illustrated are as follows:

(a) The piston guide system consisting of the piston rod 45 and the guide bush 46, has no contact with the paint. This cylindrical small-diameter guide system can easily be manufactured to high accuracy.

(b) The gasket 43, which simply provides a seal without guiding the piston, can be made of a rubber or similar material of a relatively soft grade; it too has no contact with the paint.

(c) The valve seat 12 integral with the spray head 4 is easy to clean and is removed from the body 1 when the spray head is removed.

(d) On removal of the spray head, the valve 27 prevents any escape of any paint left in the chamber 33.

(e) The two gaskets 38 and 39 associated with the paint circuit are both situated inside an annular groove in the air circuit (grooves 36 and 18), so that if the gasket is damaged there is no leakage from the gun and instead any leak is recovered from the air circuit which brings it to the spray nozzle.

(f) The deformable tube 32, for example of bronze, is a much more solid element than the Bourdon tubes used in other known spray guns.

The spray gun, illustrated is intended more particularly for automatic machines for painting or varnishing the inside of tubes or cans, may have spray heads of different forms.

In a first varian shown in FIG. 3, a pain nozzle 60 extends upwards at an angle of about 45°. The paint reaches this nozzle via a tube 61 corresponding to the tube 13 in the spray gun shown in FIG. 1. This tube 61 communicates with a duct 62 formed in a tip 63 forming a support for the nozzle 60.

The annular gap 64 between the nozzle 60 and the tip 63 receives air via a circuit 65.

An auxiliary air nozzle 66 receives air via a tube 67 corresponding to the tube 22 in the spray gun shown in FIGURE. 1.

In the alternative embodiment of a spray head, shown in FIGS. 4 and 5, a paint nozzle 70 is arranged in the same way as the nozzle 14 in the spray gun shown in FIG. 1. This nozzle 70 receives paint via a tube 71, corresponding to the tube 13 in FIG. 1, and the annular gap 72 between the nozzle 70 and the tip 73 receives air via slots 74 formed in the periphery of the rear part of the nozzle. These slots 74 lead into a chamber 75 formed in a tube 76, corresponding to the tube 16, in the gun shown in FIG. 1.

Chamber 75 receives compressed air via a duct such as the duct 17 of the gun, shown in FIG. 1.

An auxiliary air nozzle 77 receives air from the chamber 75 via a duct 78 formed in the tip 73.

For adjustment of the rate of flow of air in this auxiliary nozzle 77, the duct 78 has an adjustable closure member consisting of a plug 79 forced into a transverse aperture 80 (FIG. 5). Plug 79 has a triangular notch 81 and can be moved axially in the aperture 80 by a special tool. If it is moved in the direction of arrow A (FIG. 5), the duct 78 is throttled while, when it is moved in the opposite direction the passage increases.

This form of spray head is very suitable for very small-diameter heads, tube 76 having a diameter of about 6 mm. for example.

Although the present invention has been described in its preferred embodiment with a certain degree of particularity, it is understood that the present disclosure of the preferred embodiments has been made only by way of example and that numerous changes in the details of construction and the combination and arrangement of parts may be resorted to without departing from the spirit and the scope of the invention as hereinafter claimed.

I claim:

1. In a spray gun, a pneumatically actuated valve for controlling the flow of spray material therethrough, said valve having a valve chamber, an interior wall formed in the valve chamber, an outlet valve from the valve chamber, a valve seat surrounding the outlet, a valve member movable in the valve chamber between a first position in which it engages the valve seat and a second position in which it is clear of the valve seat, a piston reciprocable within the valve chamber, opposed first and second sides on the piston, the first side of the piston carrying the valve member, spring means tending to push the valve member against the valve seat, a deformable tube co-axial with the valve member, the deformable tube partitioning the valve chamber into inner and outer concentric annular chambers on the first side of the piston, the valve seat being situated in the inner chamber, spray material inlet means communicating with the inner chamber, pneumatic pressure inlet means communicating with the outer chamber, an annular gasket associated with the piston in the outer chamber and slidable against the interior wall of the valve chamber, an extension on the second side of the piston, the extension having a smaller diameter than the valve member and guide means formed in the valve chamber, the guide means receiving the extension.

2. In a spray gun, a pneumatically actuated valve according to claim 1, a body portion in the valve member, an axial duct in the body portion, a detachable spray head secured to the body portion, a base element in the spray head, an end part on the base element, the end part fitting into the axial duct, a duct in the base element, the duct extending through the end part and forming the outlet from the valve and an inlet to the duct in the end part, said valve seat surrounding the inlet.

3. In a spray gun, a pneumatically actuated valve according to claim 1, a body portion in the valve member, an axial duct in the body portion, an upstream portion in the axial duct, a downstream portion in the axial duct, the upstream portion having a greater diameter than the downstream portion, a shoulder on the downstream portion, a detachable spray head secured to the body portion, a base element in the spray head, an end part on the base element, the end part fitting into the downstream portion of the axial duct, said valve member having a diameter larger than the downstream portion of the axial duct, a duct in the base element, the duct extending through the end part and forming the outlet from the valve, an inlet to the duct in the end part, said valve seat surrounding the inlet and said valve member abutting the shoulder upon removal of the spray head from the valve.

4. In a spray gun, a pneumatically actuated valve according to claim 1, a peripheral lip on the annular gasket, the peripheral lip engaging the interior wall and being held thereagainst by pneumatic pressure in the outer chamber.

5. In a spray gun, a penumatically actuated valve according to claim 1, including a guide bush in said guide means, said extension being slidable in the guide bush.

References Cited
UNITED STATES PATENTS

| | | | |
|---|---|---|---|
| 2,237,842 | 4/1941 | Reynolds | 239—412 |
| 2,260,987 | 10/1941 | D'Arcy et al. | 239—412 |
| 2,614,000 | 10/1952 | Reinhold | 239—295 |
| 3,053,461 | 9/1962 | Inglis | 239—409 |
| 3,066,874 | 12/1962 | Becker | 239—411 |
| 3,136,484 | 6/1964 | Dittrich | 239—295 |

WALTER SOBIN, *Primary Examiner.*